United States Patent [19]

Motoshima et al.

[11] Patent Number: 5,107,362
[45] Date of Patent: Apr. 21, 1992

[54] OPTICAL TRANSMISSION APPARATUS

[75] Inventors: Kuniaki Motoshima; Miyuki Shuji; Tadayoshi Kitayama; Tomohiko Nambara, all of Kanagawa, Japan

[73] Assignee: Mitsubishi, Denki Kabushiki Kaisha, Japan

[21] Appl. No.: 469,077

[22] Filed: Jan. 19, 1990

[30] Foreign Application Priority Data

| Jan. 20, 1989 | [JP] | Japan | 1-11715 |
| Oct. 27, 1989 | [JP] | Japan | 1-280433 |
| Oct. 27, 1989 | [JP] | Japan | 1-280435 |
| Oct. 30, 1989 | [JP] | Japan | 1-282329 |

[51] Int. Cl.$^5$ .................................. H04B 10/00
[52] U.S. Cl. .................................. 359/187
[58] Field of Search ............... 455/613, 618, 609–611; 372/34, 31, 29; 359/187

[56] References Cited

U.S. PATENT DOCUMENTS

| 4,243,952 | 1/1981 | Petterson | 372/29 |
| 4,558,465 | 12/1985 | Siegel et al. | 455/609 |
| 4,639,924 | 1/1987 | Tsunekawa | 372/29 |

FOREIGN PATENT DOCUMENTS

| 56-26482 | 3/1981 | Japan. | |
| 0241337 | 11/1985 | Japan | 455/613 |
| 0061535 | 3/1986 | Japan | 455/618 |
| 61-198934 | 9/1986 | Japan. | |
| 0208036 | 8/1989 | Japan | 455/618 |

Primary Examiner—Reinhard J. Eisenzopf
Assistant Examiner—L. Pascal
Attorney, Agent, or Firm—Wolf, Greenfield & Sacks

[57] ABSTRACT

An optical transmission apparatus is disclosed which comprises a light emitting element for outputting an optical output in order to transmit data, a current modulation circuit, a bias current generating circuit and a resistor circuit connected in parallel with the emitting element. The current modulation circuit supplies a binary modulated current to the emitting element in response to an input binary data to the transmitted, the bias current generating circuit provides a bias current to the emitting element and the resisor circuit, whereby said bias current is kept higher than a specified level.

20 Claims, 7 Drawing Sheets

OPTICAL TRANSMISSION APPARATUS

BACKGROUND OF THE INVENTION

1. Field of the Invention

The present invention relates to an optical transmission apparatus in which a laser diode (hereinafter called LD) is used as a luminous element for outputting an optical data signal.

2. Description of the Prior Art

Figure 1:
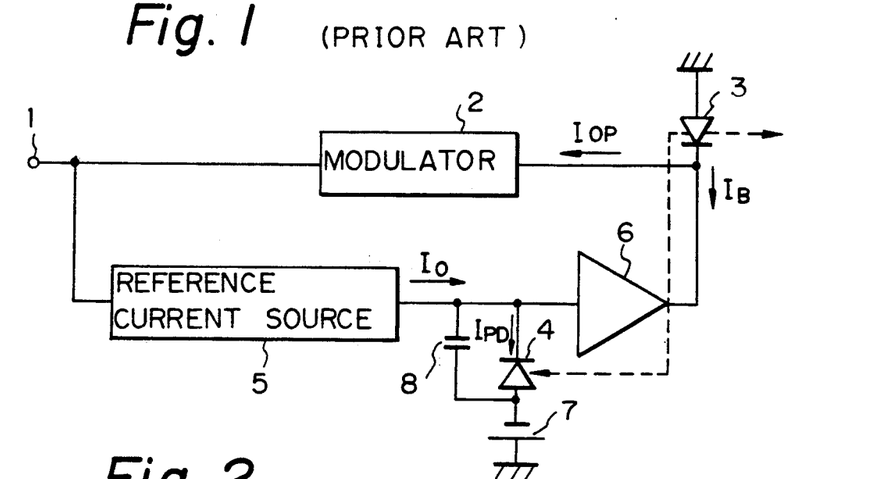
FIG. 1 illustrates a circuit diagram showing a prior optical transmission apparatus.

FIG. 1 illustrates a circuit embodiment of an optical transmission apparatus according to the prior art which has been described for example in an article No. 2246 title "Optical Transmission Apparatus with 100 Mb/s Laser Diode Provided with Carrier Detection Circuit" reported at the General National Assembly of Society of Electronic Communication 1981. In FIG. 1, numeral 1 designates a transmission data input terminal to which transmission data is input, numeral 2 a modulator adapted to modulate a current to a binary current in accordance with the transmission data input to the input terminal, numeral 3 an LD as a luminous element which emits light in accordance with the binary current output from the modulator 2, numeral 4 a light receiving element adapted to receive a portion of the light emitted by the LD 3 and transduce, or convert the received optical signal to an electrical signal, numeral 5 a reference current source adapted to output a reference current, numeral 6 a current amplifier adapted to supply a drive bias current which is proportional to the difference between the reference current provided by the reference current source 5 and the signal current transduced by the light receiving element 4, numeral 7 a bias power source for the light receiving element 4 and numeral 8 a capacitor connected in parallel with the light receiving element 4.

Figure 2:
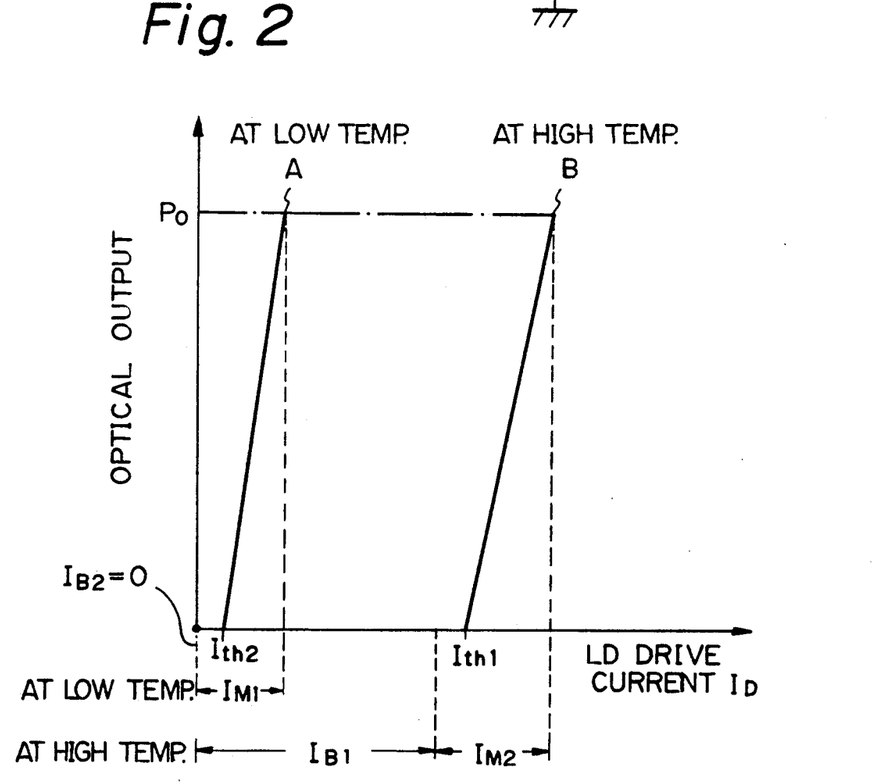
FIG. 2 shows a P-I characteristics diagram of a laser diode.

FIG. 2 is a characteristic diagram illustrating P-I characteristics of the drive current for an LD vs the optical output of the LD. In FIG. 2, symbol A designates the P-I characteristic at a low temperature while symbol B designates the P-I characteristic at a high temperature.

Figure 3:
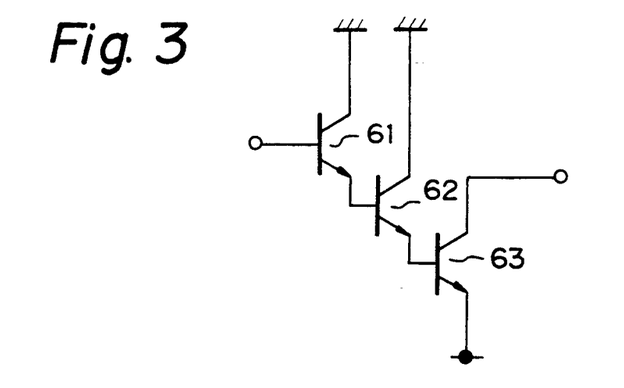
FIG. 3 illustrates an example of a current amplifier incorporated in the prior apparatus.

FIG. 3 illustrates an example of an embodiment of the current amplifier 6 wherein numerals 61 through 63 designate transistors.

Operation of the prior optical transmission apparatus as described above will next be explained. The transmission data input to the input terminal 1 is input to the modulator 2. The modulator 2 generates a current corresponding to the transmission data and supplies it to the LD 3. The transmission data is also input to the reference current source 5 and the reference current $I_O$ which is obtained by adding a current proportional to the mark ratio of the transmission data and a constant current will be output therefrom. The portion of the optical output from the LD 3 is led to the light receiving element 4, so that the light receiving element current $I_{PD}$ flows. The differential current between the reference current $I_O$ from the source 5 and the current $I_{PD}$ flowing through the element 4 is input to the current amplifier 6 and after being amplified to a specified magnification $\beta$, it is supplied to the LD 3 as the bias current. The bias current always flows through the LD 3, and the LD illuminates when the current from the modulator 2 flows through the LD 3. As the optical output from the LD 3 becomes stronger, the current flowing through the light receiving element 4 will increase. Therefore the output current from the current amplifier 6 will be smaller whereby the optical output from the LD 3 will be reduced. In the case where that the optical output from the LD 3 is reduced, the optical output from LD 3 will be conversely increased due to a similar reason. Accordingly, the optical output may be substantially kept at a constant value owing to the negative feedback operation as described above.

As far as the peak value of the optical signal at the time of transmission of the digital signal is concerned, the peak value $P_{out}$ of the optical output from the LD 3 may be expressed in the following equation:

$$P_{out} = A(I_B + I_{OP} - I_{th}) \tag{1}$$

provided, $$I_B = \beta(I_O - I_{PD}) \tag{2}$$

$$I_{PD} = mDLP_{out} \tag{3}$$

where
- $I_B$ = bias current (current output from the current amplifier)
- $I_{OP}$ = modulated current (current output from the modulator)
- $I_{th}$ = LD threshold current
- $\beta$ = amplification ratio of the current amplifier
- $I_{PD}$ = light receiving element current
- $I_O$ = reference current
- m = mark ratio of the digital signal ($0 < m \leq 1$)
- L = current transducing ratio of optical output vs light receiving element
- A = LD current/optical transducing efficient
- D = pulse duty factor.

From the foregoing equations (1), (2) and (3), the following equation may be derived:

$$P_{out} = \frac{A\beta I_O + A(I_{OP} - I_{th})}{1 + A\beta mDL} \tag{4}$$

In the equation (4), in order that the optical output $P_{out}$ be constant regardless of mark ratio change M, the reference current $I_O$ must be controlled in accordance with the mark ratio. And supposing $P_{out} = K$ (constant), $$I_O = I_{O1} + mI_{O2}$$

provided, $$I_{O1} = \frac{K}{A \cdot \beta} - \frac{I_{OP} - I_{th}}{\beta} \tag{5}$$

$$I_{O2} = KDL$$

As expressed by the foregoing equation (5), the reference current source 5 will supply the current $I_O$ comprising a constant current $I_{O1}$ and the current $mI_{O2}$ proportional to the mark ratio, so that the optical output from the LD 3 may be constant regardless of the mark ratio.

Operation of the optical transmission apparatus when the temperature has varied will next be explained. Supposing that the parameter which varies depending on the temperature is only the LD threshold current $I_{th}$ as illustrated in FIG. 2, the following equation may be derived from equation (4):

$$\frac{\partial P_{out}}{\partial T} = \frac{-A}{1 + A\beta mDL} \cdot \frac{\partial I_{th}}{\partial T} \quad (6)$$

If the value of the Fabry-Perot type LD of 1.3 μm band is considered, values of the efficient A, current transducing ratio L and $\partial I_{th}/\partial t$ are almost as follows:

$A = 0.11 (W/A)$ $L = 0.14 (A/W)$ $\frac{\partial I_{th}}{\partial t} = 3.3 \times 10^{-4} \, (A/°C.)$ Then supposing that the temperature range is $-30°$ C.$-+85°$ C., and the case of the optical output 1 mW at T = 25° C. is considered. In order that the optical output be less than 1 db with the respective mark ratio, the following equation may be derived from equation (6):

$$\frac{3.63 \times 10^{-5} \times 115}{1 + 7.7 \times 10^{-3} \times (1/8) \times \beta} \leq 0.231 \times 10^{-3} \quad (7)$$

From equation (7), $\beta \geq 17737$ is produced, provided that the minimum value of the mark ratio is $\frac{1}{8}$.

As explained above, a very large value of the current amplification ratio $\beta$ of the current amplifier 6 is required, therefore such a Darlington type amplifier as shown in FIG. 3 is employed. Supposing that the current amplification ratios of the transistors 61 through 63 are respectively $\beta_1$, $\beta_2$ and $\beta_3$, the current amplification ratio of the amplifier will be expressed as follows:

$$\beta = \beta_1 \cdot \beta_2 \cdot \beta_3 \quad (8)$$

In general, since a current amplification ratio of an npn transistor which may be obtained is more than 30, the current amplification ratio $\beta$ obtained by the current amplifier shown in FIG. 3 is more than 27,000. Accordingly, if the transistors 61 through 63 are in conductive condition, then the current amplifier 6 shown in FIG. 3 is supposed to have a sufficiently large current amplification ratio, so that an adequate APC (Automatic Power Control) characteristics may be obtained.

Since the optical transmission apparatus according to the prior art is constituted as above explained, the bias current $I_B$ of the LD 3 is generally set below the threshold current $I_{th}$. Accordingly, at a high temperature, even if the bias current $I_{B1}$ is made large enough as seen in FIG. 2, the bias current $I_{B2}$ may be almost zero at a low temperature as seen in FIG. 2. In this low temperature condition, the transistors 61-63 of the current amplifier shown in FIG. 3 are shut down, and the current amplification ratio of the amplifier will become so small that the amplification ratio required for keeping the peak value of the optical output constant relative to the mark ratio and the temperature fluctuation will no longer be secured and this reduction of the current amplification ratio will degrade the APC characteristics.

Further, it is sometimes necessary to stop the optical output from the optical transmission apparatus in order to check interruption of a network by passing another optical signal through an optical fiber for the purpose of maintenance of an optical transmission apparatus.

It also happens sometimes that the bias current flowing through the LD 3 will be monitored for maintenance of the apparatus and when the bias current value becomes abnormal, it is detected to energize an alarm.

Figure 4:
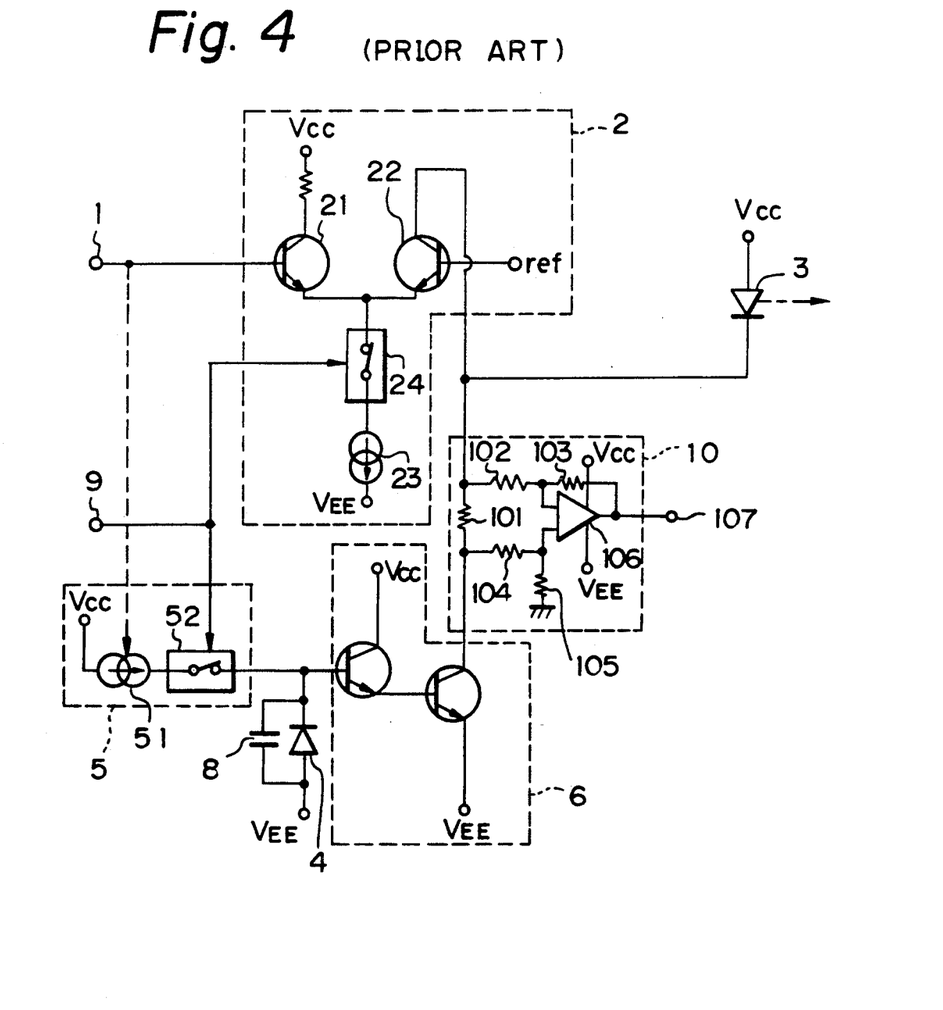
FIG. 4 is another prior optical transmission apparatus adding an optical output inhibit function and a bias current monitoring function.

In FIG. 4, there is illustrated an optical transmission apparatus according to the prior art which is provided with the function of stopping any optical output from the optical transmission apparatus and monitoring the bias current of the LD 3 as above-described.

In FIG. 4, the circuits having the similar functions as those of the circuits shown in FIG. 1 are denoted by the same numerals. It is to be noted that the transmission apparatus shown in FIG. 4 executes transmission operation substantially in a similar manner as that shown in FIG. 1. In the apparatus shown in FIG. 4, the modulation circuit 2 comprises transistors 21 and 22 forming a current switching circuit, a constant current source 23 and a switch 24 and is adapted to draw a pulse current, or binary current into the collector of the transistor 22 in response to the input data to the base of the transistor 21 whereby the LD 3 generates the optical output in response to the pulse current by the aid of the bias current from the amplifier 6. The reference current source 5 comprises a controllable constant current source 51 and a switch 52. The switches 24 and 52 are turned off by an inhibit signal supplied to an inhibit control terminal 9 in order to stop the optical output from the optical transmission apparatus.

The apparatus shown in FIG. 4 is further provided with a monitoring circuit 10 for monitoring the bias current. The monitoring circuit 10 comprises a resistor 101 for monitoring current connected between the cathode of the LD 3 and the output stage transistor of the current amplifier 6 and a buffer amplifier having a unitary gain which comprises resistors 102, 103, 104 and 105 and an operational amplifier 106. The monitoring circuit 10 is adapted to generate the same voltage as that generated across the opposite ends of the resistor 101 to the output terminal 107 whereby the current flowing through the LD 3 and the amplifier 6 can be monitored.

According to the apparatus shown in FIG. 4, when the optical output is prohibited by the inhibit signal from the terminal 9, the potential between the opposite ends of the resistor 101 in the monitoring circuit 10 will be zero and the voltage between the anode and cathode terminals of the LD 3 will also be zero. Accordingly the common mode input voltage to the buffer amplifier will be equal to the potential at the anode of the LD 3 whereby it will be equal to the potential of a power source $V_{CC}$ connected to the anode of the LD. Under this condition, the input voltage to the buffer amplifier will be outside the common mode operational range, and therefore the output terminal 107 may be dropped to the potential of a power source $V_{EE}$ connected to the operational amplifier 106. This may cause, therefore, the monitoring circuit not to operate properly and provide an erroneous alarm when the optical output is prohibited.

SUMMARY OF THE INVENTION

The present invention has been proposed to eliminate the problems as above explained. Accordingly an object of the present invention is to provide an optical transmission apparatus which provides excellent APC characteristics, not depending on the P-I characteristics of LD and any temperature fluctuation.

Another object of the present invention is to provide an optical transmission apparatus which is capable of enhancing APC characteristics of LD as well as keeping an extinction ratio and the peak value of the optical output constant.

A further object of the present invention is to provide an optical transmission apparatus which is prevented from providing any erroneous alarm when the optical output is prohibited.

The first object of the present invention is achieved by an optical transmission apparatus which comprises a current modulation circuit adapted to supply a binary current to a light emitting element in accordance with an input binary transmission data, a bias current circuit adapted to supply a bias current to the emitting element, and a resistor circuit connected in parallel with the emitting element so that the bias current is kept higher than a specified value.

The second object of the present invention is achieved by an optical transmission apparatus which comprises a current modulation circuit adapted to supply a binary current to a light emitting element in accordance with an input binary transmission data, a bias current circuit adapted to supply a bias current to the emitting element, a resistor circuit connected in parallel with the emitting element so that the bias current is kept higher than a specified value and a temperature compensation circuit for controlling the value (magnitude) of the binary current so as to be made larger as the temperature increases.

The third object of the present invention is attained by connecting a constant current source, the value of which is less than an oscillation threshold current of an LD for outputting an optical output, in series to the LD in an optical transmission apparatus.

DETAILED DESCRIPTION OF THE PREFERRED EMBODIMENTS

Figure 5:
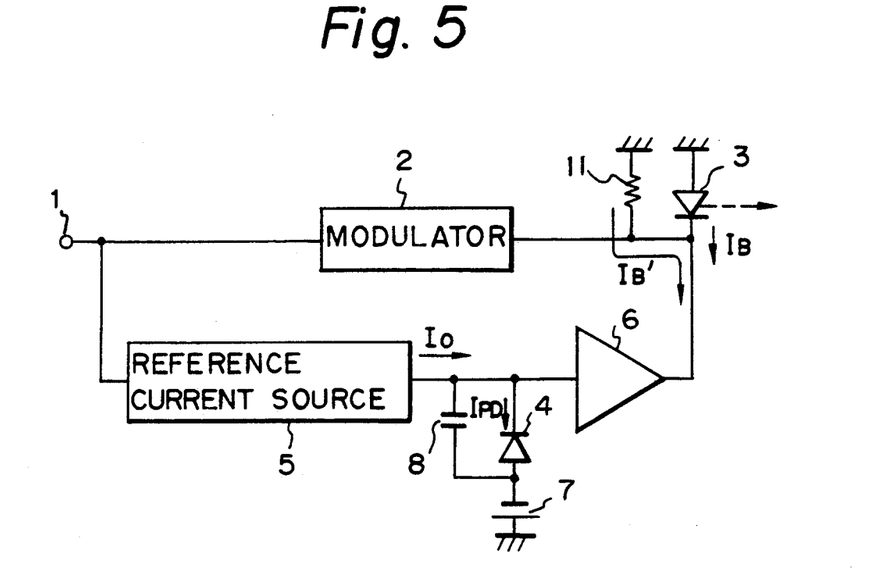
FIGS. 5 through 7 illustrate circuit diagrams showing first through third embodiments of the present invention.

An embodiment of the present invention will now be explained by referring to FIG. 5. In FIG. 5, the same components as those shown in FIG. 1 are denoted by the same numerals. The optical transmission apparatus according to the embodiment is characterized in the provision of a resistor element 11 connected in parallel to the light emitting element (LD) 3.

Operation of the embodiment shown in FIG. 5 will next be explained. In general, a voltage VF in the forward direction of an LD is in the order of 1.2 (V). Accordingly if the resistance value of the resistor 11 is assumed to be $R_B$, the current $I'_B$ which flows into the current amplifier 6 through the resistor 11 is expressed as follows:

$$I'_B = 1.2/R_B \qquad (9)$$

Assuming $R_B=300$ ($\Omega$), then $I'_B=4$ mA. This means that even in the worst case, the current above 4 mA may flow into the current amplifier 6, or there will never be any shut-down condition at the amplifier 6, whereby a high current amplification ratio $\beta$ may be assured. For the value of the resistor 11, an adequate value, which is much higher than the resistance $R_{ON}$ of the LD 3 when the LD 3 is in a ON condition, will be preferred. $R_{ON}$ is normally in the order of 5 ($\Omega$). If the value $R_B$ is more than 100 ($\Omega$), the modulation current output from the modulator 2 may substantially flow to the LD 3, so that reduction of the modulation efficiency is negligible.

Figure 6:
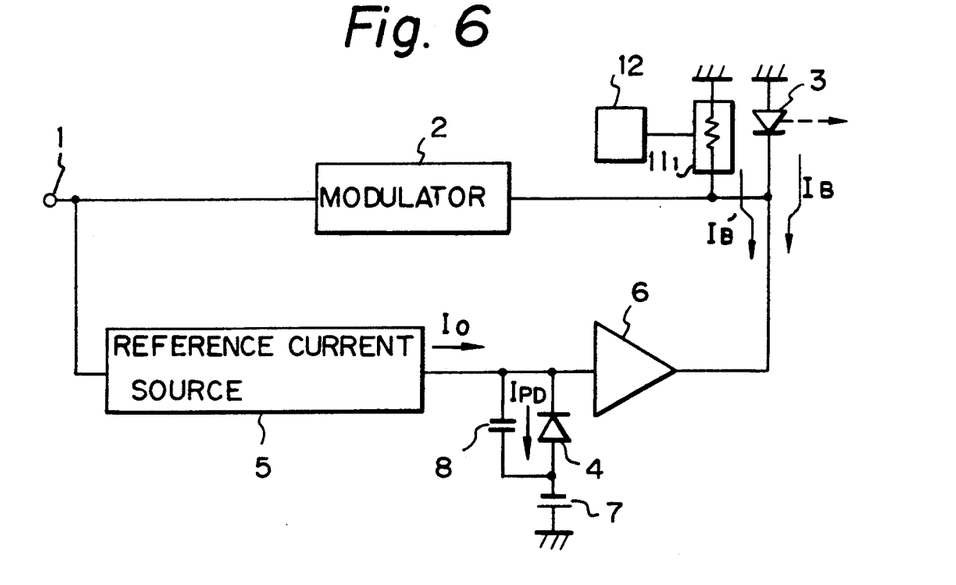
Figure 7:
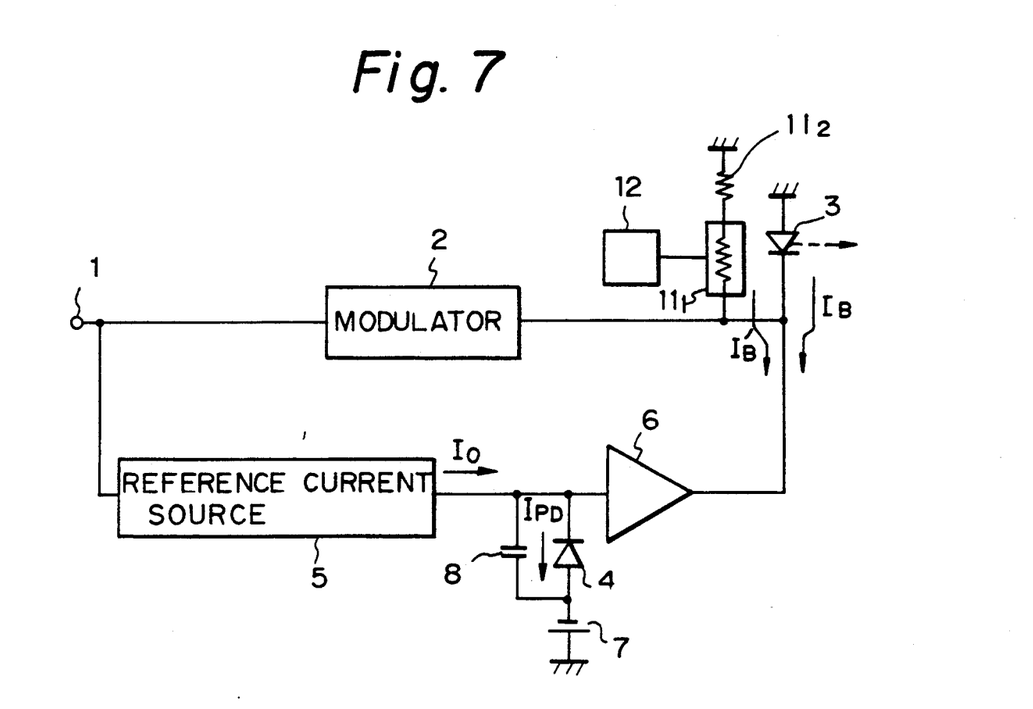

FIG. 6 and FIG. 7 illustrate second and the third embodiments of the present invention. In FIGS. 6 and 7, numeral $11_1$ designates a variable resistor and numeral 12 designate a temperature sensor. In these embodiments, the stationary resistor 11 in the first embodiment has been replaced by the variable resistor $11_1$ the value of which will be controlled depending on the temperature by means of the sensor 12. Numeral $11_2$ in FIG. 7 designates a stationary resistor which is adapted to prevent an excessive current from flowing when the resistance value of the variable resistor $11_1$ is very small depending on temperature and becomes substantially equal to the impedance of the LD 3. The value of the resistor $11_2$ is some hundred ohms.

Figure 8:
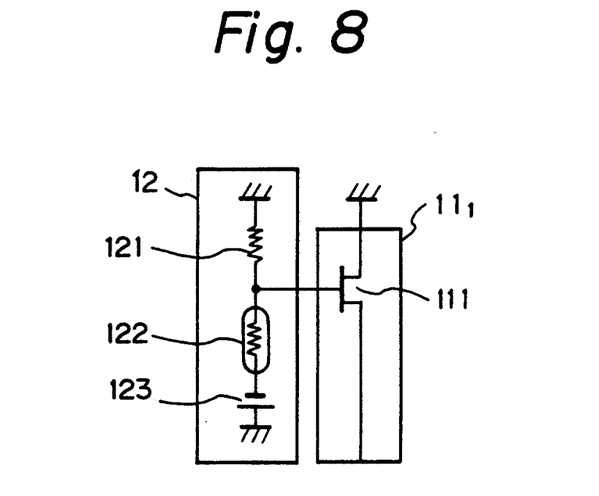
FIG. 8 illustrates a circuit diagram showing a variable resistor circuit the resistance of which depends on temperatures.

The variable resistor $11_1$ is formed for example of FET 111 as shown in FIG. 8. The temperature sensor 12 is constituted of a resistor 121, a negative characteristic thermistor 122 and a power source 123 as shown in FIG. 8. The resistance between the drain-source of FET 111 is in the range of 300-10 K$\Omega$ and variably controlled by the output of the temperature sensor 12.

According to the second and third embodiments of the present invention since the variable resistor $11_1$ which is variable depending on the temperature is connected in parallel to the LD 3, the current amplification ratio of the current amplifier 6 may be kept at a higher level in the entire temperature range than such a resistor might be otherwise connected, so that excellent APC characteristics may be assured.

Figure 9:
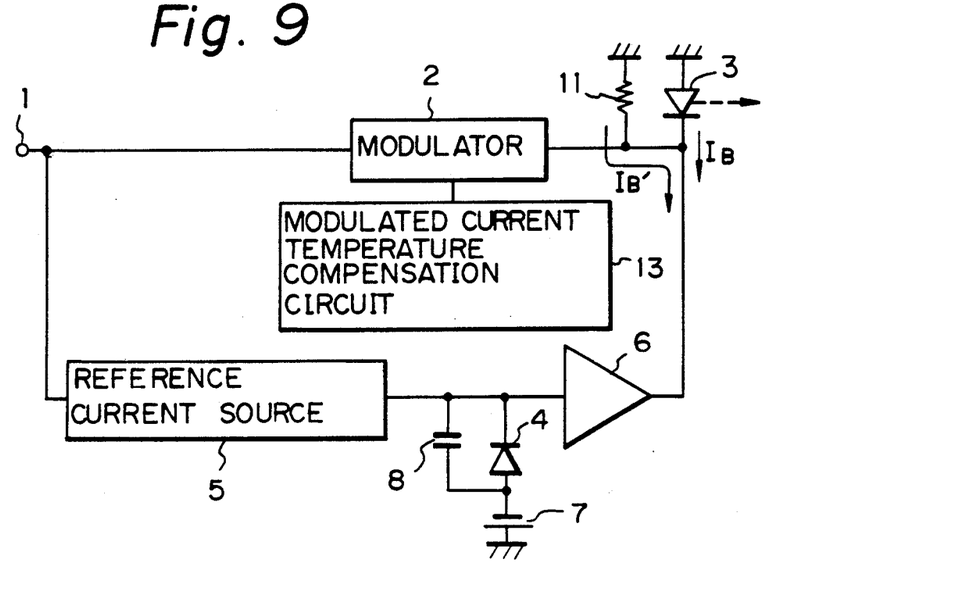
FIGS. 9 and 10 illustrate circuit diagrams showing fourth and fifth embodiments of the present invention.

In FIG. 9, there is illustrated a fourth embodiment of the present invention in which a modulated current temperature compensation circuit 13 is added to the first embodiment. The compensation circuit is adapted to make the value (magnitude) of the output current, or binary current from the modulator 2 higher as the temperature increases and smaller as it decreases.

The operational principle of the above-described compensation circuit 11 will next be explained.

As shown in FIG. 2, the current/optical transfer efficiency of an LD has a certain temperature characteristics and in the case of a Fabry-Pèrot type LD, such efficiency is varied in the order of 0.05 W/A at the temperature range of 0°-70° C. In FIG. 2, the binary current and the bias current have the values shown in Table 1 respectively.

TABLE 1

| | Modulated current | Bias current |
|---|---|---|
| At a low temperature | $I_{M1}$ | 0 |
| At a high temperature | $I_{M2}$ | $I_{B1}$ |

Since the temperature compensation circuit 13 is adapted to vary the magnitude of the binary current depending on temperature, the drive current $I_D$ ($=I_B+I_M$) of the LD 3 will vary depending on temperature. Therefore, if the bias current $I_B$ of the LD 3 keeps substantially constant regardless of the temperature, the extinction ratio and the peak value of the optical output may be kept constant.

Furthermore, if a resistor having a positive and large temperature coefficient is used as the resistor 11, excess power consumption at a high temperature may be prevented from increasing substantially. It is currently considerable to use about 5000 ppm/°C. of the temperature coefficient for the resistor. Accordingly in the temperature range of $-30°$ C.-$70°$ C., the resistance value at the temperature of 70° C. is 1.5 times as much as that at 30° C. and the power consumed by the resistor 11 may be reduced to 67% in comparison with the apparatus excluding the compensation circuit 13.

Figure 10:
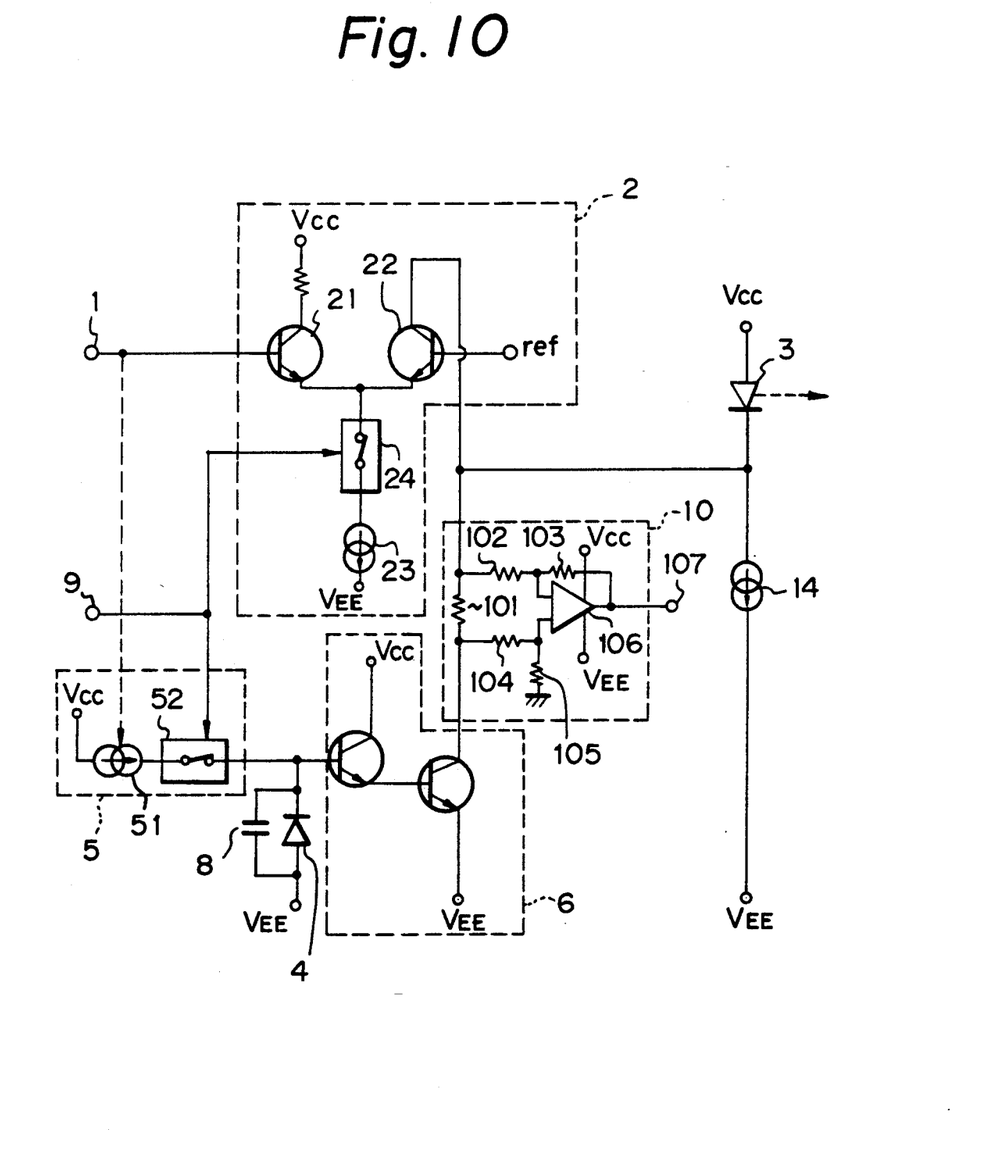

A fifth embodiment of the present invention is illustrated in FIG. 10. In FIG. 10, the circuits which are the same as those shown in FIG. 4 are denoted by the same numerals and numeral 14 designates a constant current source of which the current is set at a value less than the current value necessary for enabling the LD 3 to oscillate.

Figure 11:
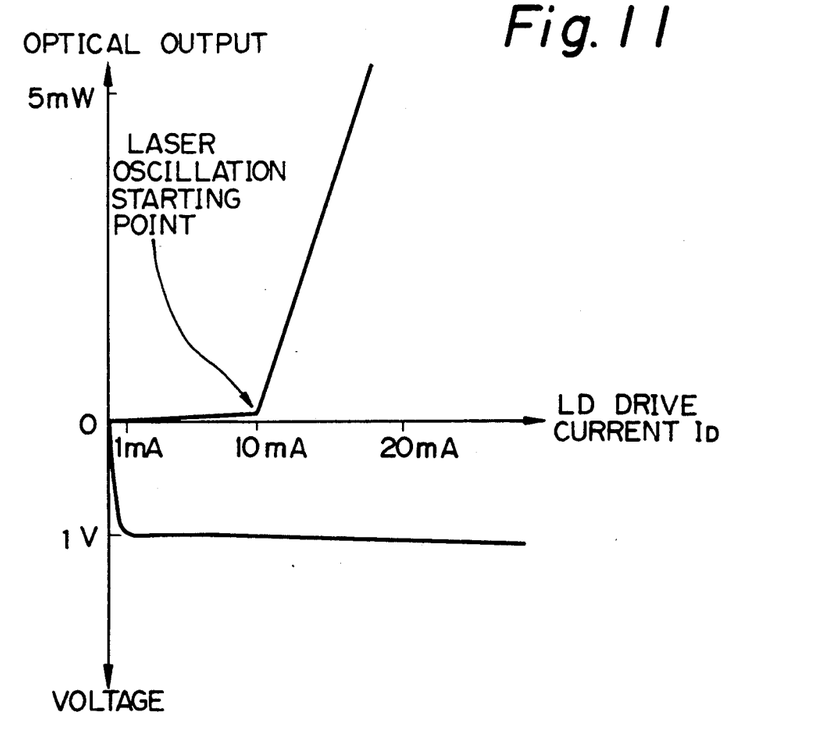
FIG. 11 shows a characteristics diagram of a drive current vs a voltage produced across ends of an LD as well as an optical output of the LD.
Figure 12:
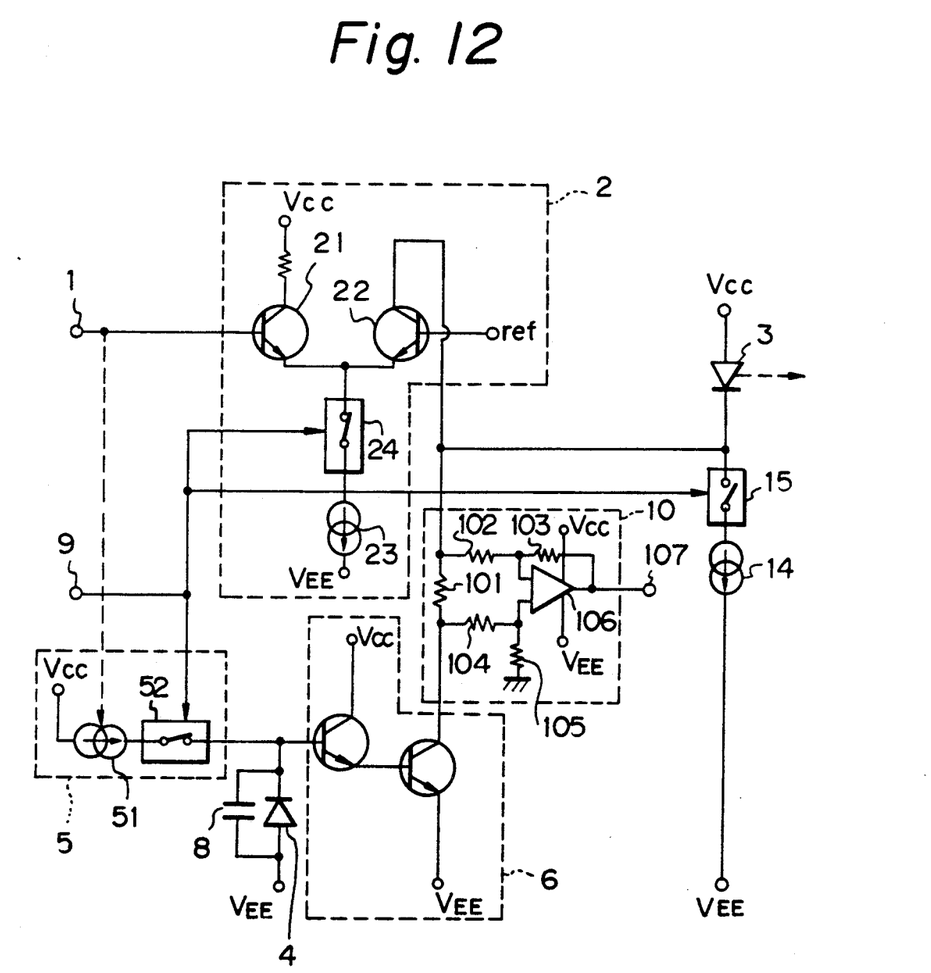
FIG. 12 shows a circuit diagram showing a sixth embodiment of the present invention.

Since an LD provides such optical output vs drive current and voltage vs drive current characteristics as shown in FIG. 11, be optical output may be provided at the current more than the oscillation threshold current value for example 10 mA as shown in FIG. 11, while the voltage between terminals of the LD may reach a normal voltage for example 1 V as shown in FIG. 11 by being supplied a small current, for example 1 mA as shown in FIG. 12.

Accordingly, by selecting a suitable current in the range from 1 to 10 mA, it is understood that the LD will not provide the optical output but the voltage between its end terminals will be of a normal value.

Therefore according to the apparatus shown in FIG. 10, if the current value of the current source 14 is selected to be in the order of 1.5 mA for example, the LD 3 will not provide the optical output when it is prohibited and the voltage between its end terminals will be in the order of 1 V, whereby the common mode input voltage of the monitoring circuit 10 will drop by approximate 1 V from the voltage $V_{CC}$ of the source. Therefore, the output from the monitoring circuit will not be attracted by the voltage $V_{EE}$ of the other source and no erroneous alarm will be provided.

FIG. 12 illustrates a sixth embodiment in which a switch 15 is added to the embodiment shown in FIG. 10 by connection in series to the current source 14. The switch 15 is so designed as to be turned on by the optical output inhibit signal applied to the terminal 9. Accordingly in the normal operation, the current source 14 is separated from the LD 3 to reduce the consumption of electric power.

In the case of the embodiments shown in FIGS. 10 and 12, if the current value of the current source 14 is set sufficiently low taking into consideration the possibility of the oscillation threshold current value of the LD 3 being reduced at a low temperature, the extinction ratio will never be degraded. If a resistor is connected in parallel with the LD 3, it is necessary to set the current value of the current source 14 at a rather large value, but the current value may be suitably set in conjunction with degradation of the extinction ratio.

In the respective embodiments as described above, although a Darlington connection current amplifier is employed as the current amplifier 6, it is of course possible to employ a combination of a voltage amplifier and a voltage/current conversion circuit.

It is also possible that the switch 52 (see FIGS. 10 and 12) provided for prohibition of the optical output may be connected in series to the resistor 101 of the monitoring circuit 10 to execute the same operation.

As explained above, according to the first through third embodiments of the present invention, the current amplification ratio of the current amplifier may be kept at sufficiently high values at the respective temperatures and a favorable APC operation may be assured by connecting the resistor circuit in parallel with the LD.

Furthermore, according to the fourth embodiment of the present invention, by adding the modulated current temperature compensation circuit adapted to compensate for temperature change and to control the value of the binary current from the current modulation circuit to the LD, the bias current for the LD may be kept constant in a wide temperature range, and the extinction ratio and the peak value of the optical output may be kept constant.

According to the fifth and sixth embodiments of this invention, by connecting the constant current source in series to the LD in the optical transmission apparatus including the bias current monitoring circuit, the monitoring circuit will not provide any alarm output when the optical output is inhibited.

It is further understood by those skilled in the art that the foregoing description represents preferred embodiments of disclosed device and that various changes and modifications may be made in the invention without departing from the spirit and scope thereof.

What is claimed is:

1. An optical transmission apparatus comprising:
   a light emitting element for outputting an optical output in order to transmit data:
   current modulation means for supplying a binary modulated current to said light emitting element in response to an input binary data;
   bias current means which comprises photoelectric converting means for receiving a part of said optical output from said light emitting element and outputting a current according to the received optical output, a reference current source for outputting a constant reference current, and a current amplifier means for amplifying the different current between said current output from said photoelectric converting means and said reference current and for outputting the amplified current as said bias current to said light emitting element; and
   resistor means connected in parallel with said light emitting element for keeping said bias current from said bias current means higher than a specified value, whereby current gain of said current amplifier means is kept sufficiently large.

2. An apparatus according to claim 1, wherein said resistor means is variable depending on temperatures.

3. An apparatus according to claim 1, wherein said resistor means comprises: a variable resistor element which has a control terminal; and resistance control means for supplying a control signal, having a value depending on temperature, to said control terminal of said variable resistor element to control the resistance of said variable resistor element.

4. An apparatus according to claim 1, wherein said resistor means comprises variable resistor means, the resistance of which varies depending on temperature, and a fixed resistor connected in series with said variable resistor means.

5. An apparatus according to Claim 4, wherein said variable resistor means comprises: a variable resistor element which has a control terminal; and resistance control means for supplying a control signal, having a value depending on temperature, to said control terminal of said variable resistor element to control the resistance of said variable resistor element.

6. An apparatus according to Claim 3 or 5, wherein said variable resistor element comprises an FET having a gate as said control terminal.

7. An apparatus according to Claim 6, wherein said resistance control means comprises a fixed resistor, a thermistor and a bias voltage source forming a series circuit, and a node between said fixed resistor and said thermistor that is connected to said gate of said FET.

8. An apparatus according to Claim 1, further comprising modulated current temperature compensation means for compensating for temperature change in the manner that the magnitude value of said binary current from said current modulation means is made larger as the temperature increases and smaller as it decreases.

9. An apparatus according to Claim 1, wherein said light emitting element comprises a laser diode.

10. An optical transmission apparatus comprising:
a laser diode element (LD) for outputting an optical output in order to transmit data;
current modulation means for supplying a binary modulated current to said LD in response to an input binary data, and said modulation means stops to supply said binary current when an inhibit signal is input thereto;
bias current means for generating a bias current to said LD, and said bias current means stops to generate said bias current when said inhibit signal is input thereinto;
monitoring means for monitoring said bias current including a resistor disposed in the bias current path from bias current means to said LD, and a buffer amplifier responsive to, and which outputs the same voltage as, the voltage caused across the ends of said resistor; and
current source means connected in parallel with said bias current path for flowing a constant current through said LD, the value of which is less than the oscillation threshold current value of said LD, whereby said LD is provided by said current source means with a sufficient operating voltage between the anode and cathode thereof even when said inhibit signal is input to said bias current means to prevent operation of said LD.

11. An apparatus according to claim 10, wherein said current source means comprises a constant current source and means for inhibiting said constant current from flowing when said inhibit signal is not input to said apparatus.

12. An apparatus according to claim 11, wherein said means for inhibiting said constant current comprise a switch connected in series to said constant current source, said switch is turned on when said inhibit signal is input to said apparatus.

13. An apparatus according to claim 10, wherein said value of said constant current is in the range from 1 mA to 10 mA.

14. An apparatus according to claim 10, further comprising resistor means connected in parallel with said LD.

15. An optical transmission apparatus comprising:
a light emitting element for outputting an optical output in order to transmit data;
current modulation means for supplying a binary modulated current to said light emitting element in response to an input binary data;
temperature compensation means for compensating for temperature change in the manner that the magnitude value of said binary current from said current modulation means is made larger as the temperature increases and smaller as it decreases; and
bias current means for generating a bias current to said light emitting element and said temperature compensation means, whereby said bias current from said bias current means is kept higher than a specified level,
wherein said temperature compensation means comprises
a variable resistor element which has a control terminal; and
resistance control means for supplying a control signal, having a value depending on temperature, to said control terminal of said variable resistor element to control the resistance of said variable resistor element.

16. An apparatus according to claim 15, wherein the specified level is greater than zero.

17. An optical transmission apparatus comprising:
a light emitting element for outputting an optical output in order to transmit data;
variable resistor means, substantially variable depending on temperature, connected in parallel with said light emitting element;
current modulation means for supplying a binary modulated current to said light emitting element in response to an input binary data; and
bias current means for generating a bias current to said light emitting element and said variable resistor means, whereby said bias current from said bias current means is kept higher than a specified level,
wherein said variable resistor means comprises
a variable resistor element which has a control terminal; and
resistance control means for supplying a control signal, having a value depending on temperature, to said control terminal of said variable resistor element to control the resistance of said variable resistor element.

18. An apparatus according to claim 17, wherein said variable resistor means further comprises a fixed resistor connected in series with said variable resistor element.

19. An apparatus according to claim 18, wherein:
said variable resistor element comprises an FET having a gate as said control terminal; and
said resistance control means comprises a fixed resistor, a thermistor and a bias voltage souce forming a series circuit, and a node between said fixed resistor and said thermistor that is connected to said gate of said FET.

20. An apparatus according to claim 17, wherein the specified level is greater than zero.

* * * * *